United States Patent [19]
Jury et al.

[11] Patent Number: 5,918,054
[45] Date of Patent: Jun. 29, 1999

[54] DISTRIBUTED ELECTRONIC PERFORMANCE SUPPORT SYSTEMS

[75] Inventors: Thomas W. Jury, Beavercreek; Tab McCollum, Camden, both of Ohio

[73] Assignee: NCR Corporation, Dayton, Ohio

[21] Appl. No.: 08/744,835

[22] Filed: Nov. 6, 1996

[51] Int. Cl.[6] ................................................. G06F 17/30
[52] U.S. Cl. ..................................... 395/712; 395/200.51
[58] Field of Search .............................. 395/712, 200.51, 395/200.52, 651, 652, 653, 200.32, 200.33; 707/10, 205, 206

[56] References Cited

U.S. PATENT DOCUMENTS

| | | | |
|---|---|---|---|
| 5,444,615 | 8/1995 | Bennett et al. ............................ | 705/8 |
| 5,606,493 | 2/1997 | Duscher et al. ................... | 395/200.32 |
| 5,692,129 | 11/1997 | Sonderegger et al. .................... | 707/10 |
| 5,721,824 | 2/1998 | Taylor ................................. | 395/200.33 |
| 5,748,894 | 5/1998 | Ishizaki et al. ..................... | 395/200.32 |
| 5,764,908 | 6/1998 | Shoji et al. ......................... | 395/200.33 |
| 5,768,506 | 6/1998 | Randell ............................... | 395/200.32 |
| 5,768,511 | 6/1998 | Galvin et al. ....................... | 395/200.33 |
| 5,768,566 | 6/1998 | Harikrishnan et al. ................ | 395/500 |
| 5,778,368 | 7/1998 | Hogan et al. ....................... | 395/187.01 |

OTHER PUBLICATIONS

C. J. Ross, "Integrated Performance Support", *Courseware*, Andersen Consulting, Jul. 1993, pp. 1–6.

K. L. Gustafson and T. C. Reeves, "IDioM: A Platform for a Course Development Expert System", *Educational Technology*, Mar. 1990, pp. 19–25.

Gloria Gery, "Electronic Performance Support Systems", Weingarten Publications, 1991, pp. 125–138.

Gery & Associates, "Consultants in Business Learning and Performance Support Systems", Oct. 29, 1993.

B. Raybould, "A Modular Approach to Electronic Performance Support", *Data Training*, Mar./Apr. 1992, pp. 24, 38.

B. Raybould, An EPSS Case Study: Prime Computer, Ariel PSS Corporation, 1991, pp. 1–11.

Lewis J. Perelman, "Kanban to Kanbrain", *Forbes ASAP*, Jun. 6, 1994.

ComWare, "Esther Dyson Says Technologies and Time Ripe for Electronic Performance Support", Aug. 24, 1993.

Beverly Geber, "Help! The Rise of Performance Support Systems", *Training*, Dec. 1991, pp. 23–28.

ComWare, "Knowledge Support Services", 1991.

*Primary Examiner*—Eric W. Stamber
*Attorney, Agent, or Firm*—Gregory A. Welte

[57] ABSTRACT

Improvement for an Electronic Performance Support System, EPSS. A simplified prior-art EPSS can be viewed as a computerized system which divides a process, such as designing, building, and marketing an automobile, into individual stages. At each stage, the EPSS makes various tools available to users and, in general, the tools available at one stage are different than those available at other stages. Under one form of the invention, tools for the EPSS are stored at remote locations, and retrieved through a public-access computer network, such as the Internet.

13 Claims, 6 Drawing Sheets

DISTRIBUTED ELECTRONIC PERFORMANCE SUPPORT SYSTEMS

The invention concerns Electronic Performance Support Systems (EPSS), in which tools and assets are permanently stored at remote locations, rather than at the computer running the EPSS.

BACKGROUND OF THE INVENTION

Electronic Performance Support Systems (EPSS) are known in the art. In general, EPSS's are computer-based systems which assist users in executing processes The term "process" is defined broadly, and includes, for example, not only a process of manufacturing a product, but also the associated steps of (a) designing the product, (b) analyzing markets for the product, (c) developing marketing strategies for the product, (d) distributing the product to retailers, and so on. In addition, "process" includes situations in which the product is information, or related material.

Further information concerning EPSS's generally is available in the book *Electronic Performance Support Systems: How and Why to Remake the Workplace Through the Strategic Application of Technology*, by Gloria Gery.

Typically, EPSS's are implemented on a stand-alone basis. The various capabilities of the system, indicated by the various blocks 12 through 39 in FIG. 1 (later discussed), are determined by the designer of the system, and are implemented in a single system, such as a micro-computer. However, even though system designers are skilled persons, and produce EPSS's which are quite useful, nevertheless, it is possible that third parties, who are unaffiliated with the designers, may later propose modifications to the EPSS which offer significant improvements in performance. It is desirable to allow such third parties to offer their improvements to the EPSS in a convenient manner.

OBJECTS OF THE INVENTION

An object of the invention is to provide an improved Electronic Performance Support System (EPSS).

A further object of the invention is to provide an EPSS to which remote parties can contribute tools.

A further object of the invention is to provide an EPSS to which remote parties can contribute tools, by way of a public-access data network, such as the Internet.

SUMMARY OF THE INVNETION

In one form of the invention, tools for EPSS's are stored at various locations, remote from the EPSS, and are made accessible through a public-access computer network, such as the Internet. A user retrieves a tool only when necessary, and, until then, does not store the tool locally.

DETAILED DESCRIPTION OF THE INVENTION

Example of EPSS

This section will explain a hypothetical EPSS, which assists a patent attorney in the process of writing and prosecuting a patent application. This EPSS is taken as illustrative of characteristics of EPSS's generally.

Figure 1:
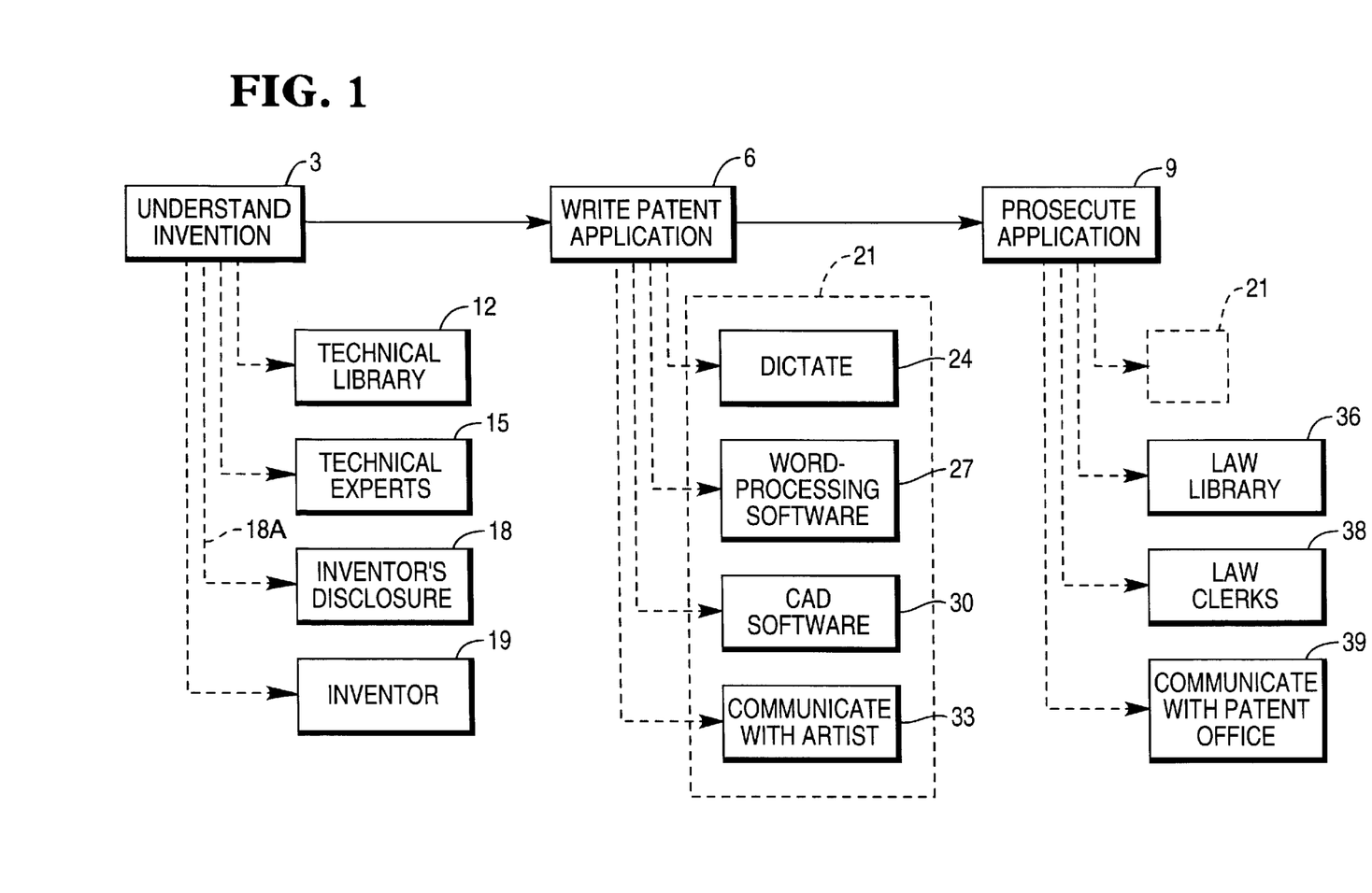
FIG. 1 illustrates a hypothetical Electronic Performance Support System.

In FIG. 1, blocks 3, 6, and 9 illustrate three steps involved in the process. Block 3 indicates that, initially, the author of the patent application must understand the invention. (The author will, in most cases, be a patent attorney or patent agent.) In pursuit of this understanding, the author may consult an inventor's disclosure 18, as indicated by arrow 18A. The inventor's disclosure is a description of the invention written by the inventor. The author may also wish to consult technical experts 15 or a technical library 12, in order to obtain a technical background regarding the invention. The author may also wish to consult the inventor, as indicated by block 19.

Accomplishment of the tasks indicated by blocks 12, 15, 18, and 19 can be assisted by the EPSS. For example, if the author is equipped with a computer, the inventor's disclosure 18 can take the form of an electronic mail message, or other document, delivered to, and displayed by, the computer.

Similarly, the technical library 12 can take the form of documents electronically stored, which are retrievable by the computer. For example, the *McGraw-Hill Encyclopedia of Science and Technology* is frequently consulted by authors of patent applications, in order to secure background knowledge of a given technology, and to providing references to relevant textbooks and journal articles. Availability of such encyclopedias on CD-ROM, or through on-line services, can implement block 12.

The author may wish to consult technical experts, as indicated by block 15, or to consult the individual inventor. Telecommunication facilities, provided by the computer, can assist this pursuit. For example, personal-computer-based video-conferencing systems are commercially available, such as that marketed under the trade name Vistium, from AT&T Corporation, Naperville, Ill.

Once the understanding of block 3 is attained, the author will begin writing the patent application. In this pursuit, the author may wish to dictate the patent application, as indicated by block 24. The dictation can be assisted by speech-recognition equipment, known in the art, such as that available from Kurzweil Applied Intelligence, Waltham, Massachusetts, or from IBM Corporation, Armonk, N.Y.

The speech-recognition equipment accepts verbal dictation from the author, translates the verbal dictation into printed words, and stores binary representations of the printed words in a computer file.

The author may wish, instead, to write the patent application directly, as by using word-processing software 27.

The author will probably require drawings to accompany the patent application, which the author can sketch using a CAD (Computer-Aided Design) software 30. Alternately, the author may wish to recruit a professional artist, with whom the author must communicate as indicated by block 33. The video conferencing capability, described above, can be used to accomplish this communication.

In the process indicated by block 9, the author may wish to again use some, or all, of the facilities exercised in step 6, as indicated by dashed block 21, for purposes such as amending the patent application, and changing the drawings. In addition, the author may wish to obtain access to a law library 36, as by connecting to an on-line service such as that marketed under the trade name LEXIS by Mead Data Corporation, Dayton, Ohio.

Also, the author may wish to assign a law clerk the task of researching points of law, as indicated by block 38. Further, the author may wish to communicate with the patent examiner handling the patent application, as indicated by block 39 The functions of blocks 36 and 39 can be accomplished by the Vistium system, discussed above.

In addition, at any of the steps in the process, the author may wish to communicate with other parties, as by electronic mail or by facsimile documents, which can be handled by the computer.

FIG. 1 may be taken as a menu, displayed by a computer display, which implements the EPSS described in the Background of the Invention. The individual blocks, such as 3, 6, 9, 12, and so on, represent icons, as that term is used in graphical user interfaces. Selecting an icon by a pointing device (not shown), such as icon 30, causes an appropriate program to be run, which is a CAD program in the case of icon 30. Similarly, icon 33 represents the video-conferencing system described above. Selecting that icon causes the video-conferencing software to be launched, and causes a request to be issued which asks for a telephone number of a party with whom the conference is to be held.

One Form of Invention
Overview

In brief, tools, in addition to those represented by the icons of FIG. 1, may be available, but not installed in the EPSS. For example, a software developer may have produced a new software package which performs functions not even imagined at the time the EPSS was designed. That package will not be contained in the EPSS, as originally designed.

The invention allows the software developer to make available the package, or a demonstration version of it, to the EPSS, through commercially available network pathways.

Greater Detail
Registry

The invention allows persons to contribute, or offer, new tools to the EPSS. A public registry is provided, in which EPSS users enter (a) their names,
(b) their addresses,
(c) information about their EPSS's,
(d) information about tools which they would like to see developed for their EPSS's, and
(e) particular areas of interest.

A commercially available computer "bulletin board" can provide such a registry.

Providers of tools examine the registry, seeking EPSS users who may be interested in the provider's tools. Categories (d) and (e) assist the providers in eliminating EPSS users who would not be interested in the provider's tools, and also assist the EPSS users in avoiding contact with providers in whom the users have no interest.

For example, one EPSS user may be a civil engineering firm, which is interested in finite-element analysis programs which design concrete beams. Another EPSS user may be an Italian restaurant, having interest in databases of northern Mediterranean cuisine. Plainly, a provider of the finite-element analysis program wishes to know of the civil engineering firm's interest in such programs, and also wishes to know the Italian restaurant's lack of interest, in order to avoid contacting the restaurant.

Developers' Use of Registry

Developers of new tools examine the registry. When a developer learns of an EPSS which may be interested in the developer's tool, the developer makes the tool available to the EPSS.

One way of making the tool available is to physically transport the tool to the EPSS, as by courier or government postal service. Another way is for the developer to gain access to the EPSS, and to install the program directly. However, this latter approach may be considered undesirable from the perspective of security of the EPSS.

Yet another way is to send a message to the user of the EPSS, as by electronic mail, informing the user of the availability of the new tool. The message tells the user how to download the tool, for inspection.

For example, the message can provide a network address of the tool, so that the EPSS user can download the tool, using a public-access network, such as the Internet. As another example, the message can provide a telephone number whereby the user can connect with a server directly, for retrieving the tool. Irrespective of how the user obtains the tool, the user installs the tool in the usual manner.

One Preferred Approach

Figure 2:
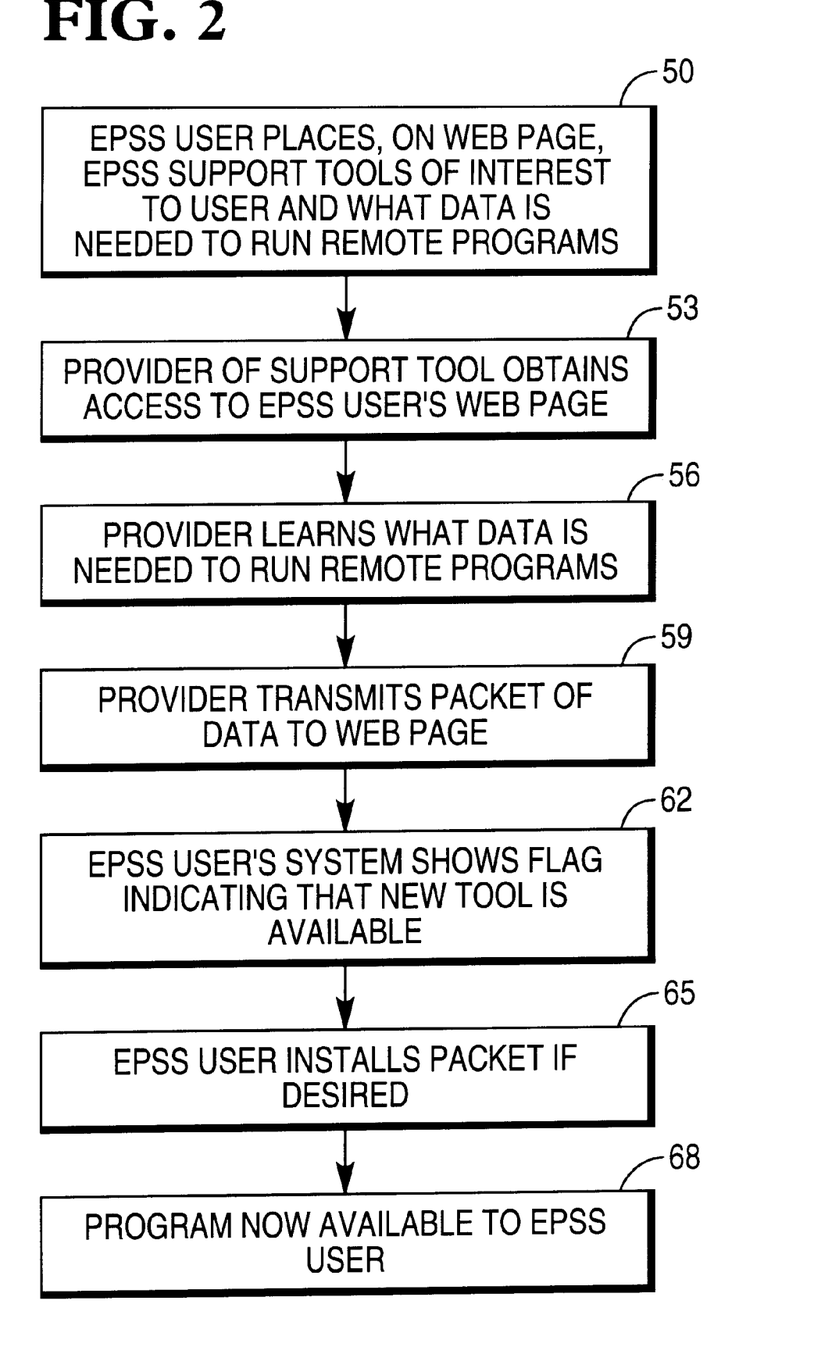
FIG. 2 illustrates a flow chart of steps undertaken by one form of the invention.

One preferable approach is illustrated in FIG. 2. As indicated in block 50, a user of the EPSS provides information as to products of interest to the user. As indicated in block 53, a provider examines this information.

As indicated in block 50, the user makes available all relevant information needed to run programs which are located at remote sites. For example, if the EPSS runs the operating system Windows, available from Microsoft Corporation, Redmond, Wash., then the EPSS informs the public as to the version number, directories storing critical program modules, and all other information needed to run a program on that operating system If the EPSS runs another operating system, such as UNIX, the EPSS informs the public of the analogous information.

The EPSS can make this information available to the public through what is known as a "Web Page," over the Internet, or through a comparable service.

As indicated in blocks 56 and 59, a provider of a tool retrieves this information, perhaps from a Web Page, and thereby ascertains what must be sent to the EPSS user to enable the EPSS to use the tool. The provider generates a packet of data containing the necessary information. For example, the packet may contain a digitized icon, in the form of the trademark of the provider, to be placed upon the computer display of the EPSS, and which causes launching of the program, when selected by a pointing device. The packet will also contain a pointer, which provides the address of the program. In general, the program can be located at any of numerous locations, and need not be downloaded to the EPSS.

Further, more than one program may be required, and these need not be stored at a common location. For example, many word-processing programs also contain a "spell-checking" function. However, it is not uncommon for the spell-checking function to be implemented as a separate program, which does not ordinarily run while the word-processing program runs. But when the spell-checking feature is invoked, the spell-checking program is caused to run alongside the word-processing program.

In such cases, the provider includes a pointer for each required program within the packet sent to the EPSS, so that all required programs can be located and retrieved.

As indicated in block 62, the packet is made available to the user of the EPSS. The packet can be sent to the EPSS in many different ways. It may be sent in the form of electronic mail, if the EPSS is equipped to receive such mail. Alternately, the EPSS, in its Web Page, may provide for the direct transmission, or uploading, of data to the EPSS. The provider would then upload the packet after logging on to the provider's Web Page. As another alternate, the provider may transmit the packet to a server associated with the EPSS, from which the EPSS fetches the packet.

When the user obtains the packet, the user installs the software, as indicated by blocks 65 and 68.

Irrespective of how the packet is transmitted to the EPSS, two rules are preferably obeyed. One is that the provider gains no "controlling access" to the EPSS. For example, if the EPSS is microcomputer-based, the provider gains no power to launch programs, nor any access to commands of the operating system. This absence of "controlling access" prevents unscrupulous providers from damaging EPSS's.

A second rule is that the new program is not installed without the consent of the EPSS user. However, once the user consents, the program is installed in the usual manner.

A third rule, which is considered desirable, is that the provider include a program which de-installs the program if the user requests. De-installation can be important where the program uses numerous modules, which are distributed in many different directories. If the user tests the program, but decides that the program is not suitable, then the user will wish to avoid having these modules clutter the user's directories. The user wishes a single process to remove the unwanted modules.

Second Form of Invention

Figure 3:
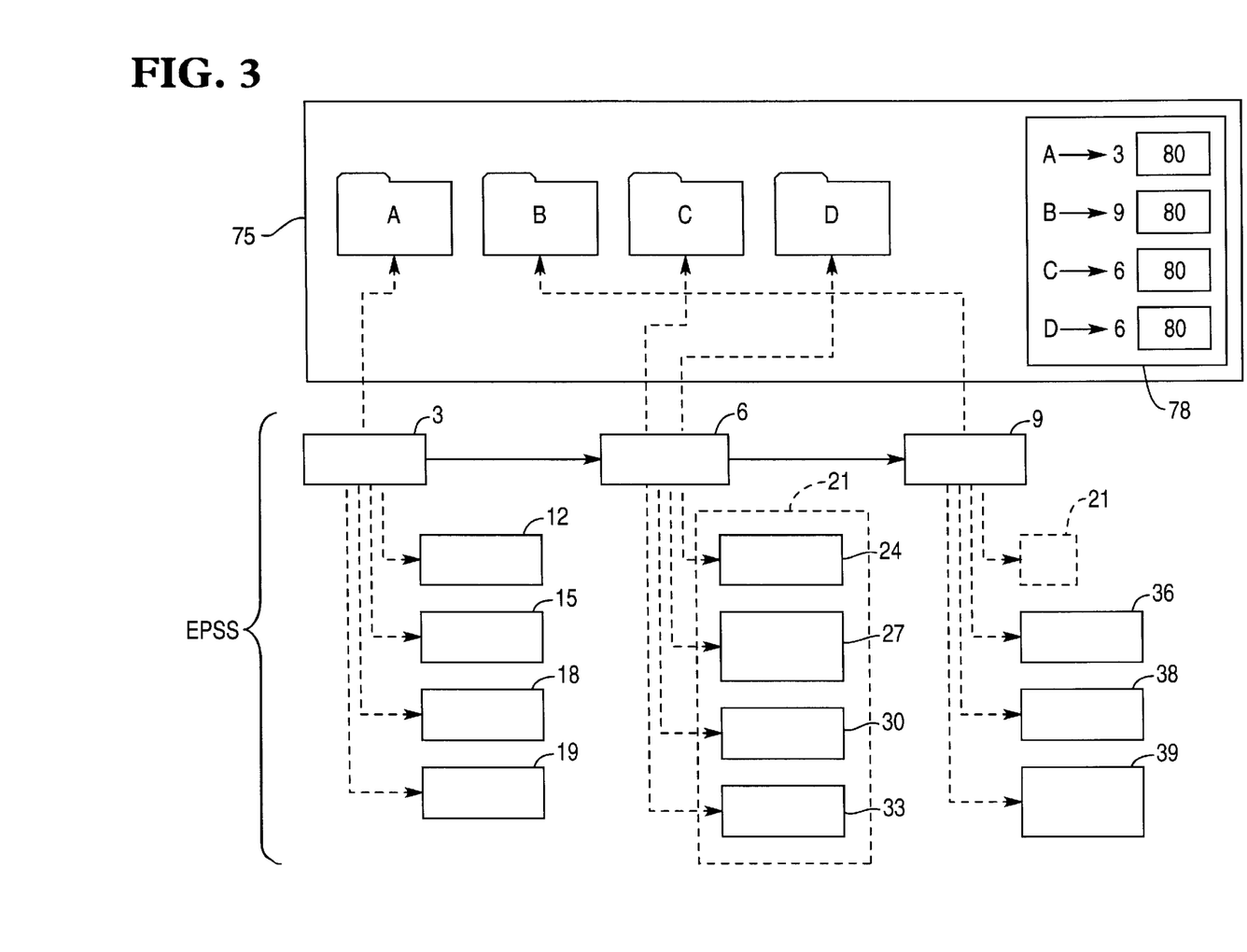
FIG. 3 illustrates provision of tools, such as A through D, which are located at remote sites, to an EPSS.

FIG. 3 contains a simplified view of FIG. 1, and illustrates the EPSS described above. FIG. 3 also contains a repository 75, which holds tools, indicated by files A through D. The repository 75 is a computer-accessible memory.

These tools are provided by users of the EPSS. That is, the users examine various tools over time, in connection with the users' activity with the EPSS, and select those considered best. These selections are represented by tools A through D. This selection procedure represents an evolutionary process, wherein the most favored tools become available to the users of the EPSS.

An index 78 is also provided, wherein the users identify the stages in the process to which the added tools are relevant. For example, tool A is relevant to stage 3, which is the "UNDERSTAND INVENTION" stage of FIG. 1. This index, in effect, associates the tools with their respective stages, as indicated by the dashed arrows above stages 3, 6, and 9. The association is similar to that indicated by the dashed arrows lying below stages 3, 6, and 9, such as the arrow connecting stage 3 with block 12.

In one mode of operation, the EPSS restricts availability of tools to the users who are involved in the stage with which the tool is associated. For example, tool C in FIG. 3 is made available only to users involved in stage 6, as indicated by the index 78. Stage 6 is the "WRITE PATENT APPLICATION" stage of FIG. 1.

The index 78 can also be equipped with the facility to store comments, as indicated by blocks 80. The first comment, chronologically, will probably be provided by the user who contributes a tool to the repository 75. Other comments will, of course, be provided by other users.

The embodiment shown in FIG. 3 owns a significant advantage over prior-art EPSS'S. Prior-art EPSS's are generally stand-alone systems, which are designed for specific purposes, and whose design cannot be modified, except, perhaps, to accommodate new versions of the same commercial software which was originally designed into the EPSS. Restated, different tools cannot be added to the prior-art EPSS. One simple reason is that the menu structure, through which a user navigates from stage-to-stage, as from stage 3 to stage 6, does not allow the addition of new tools to the menus.

In contrast, the embodiment of FIG. 3 allows a community of users to add (and delete) tools from the repository 75. The EPSS of the FIG. is not a stand-alone system, and its tool repository can change with time. The invention allows the best practices, as determined by the users, to become the most common practices.

Third Form of Invention

Figure 4:
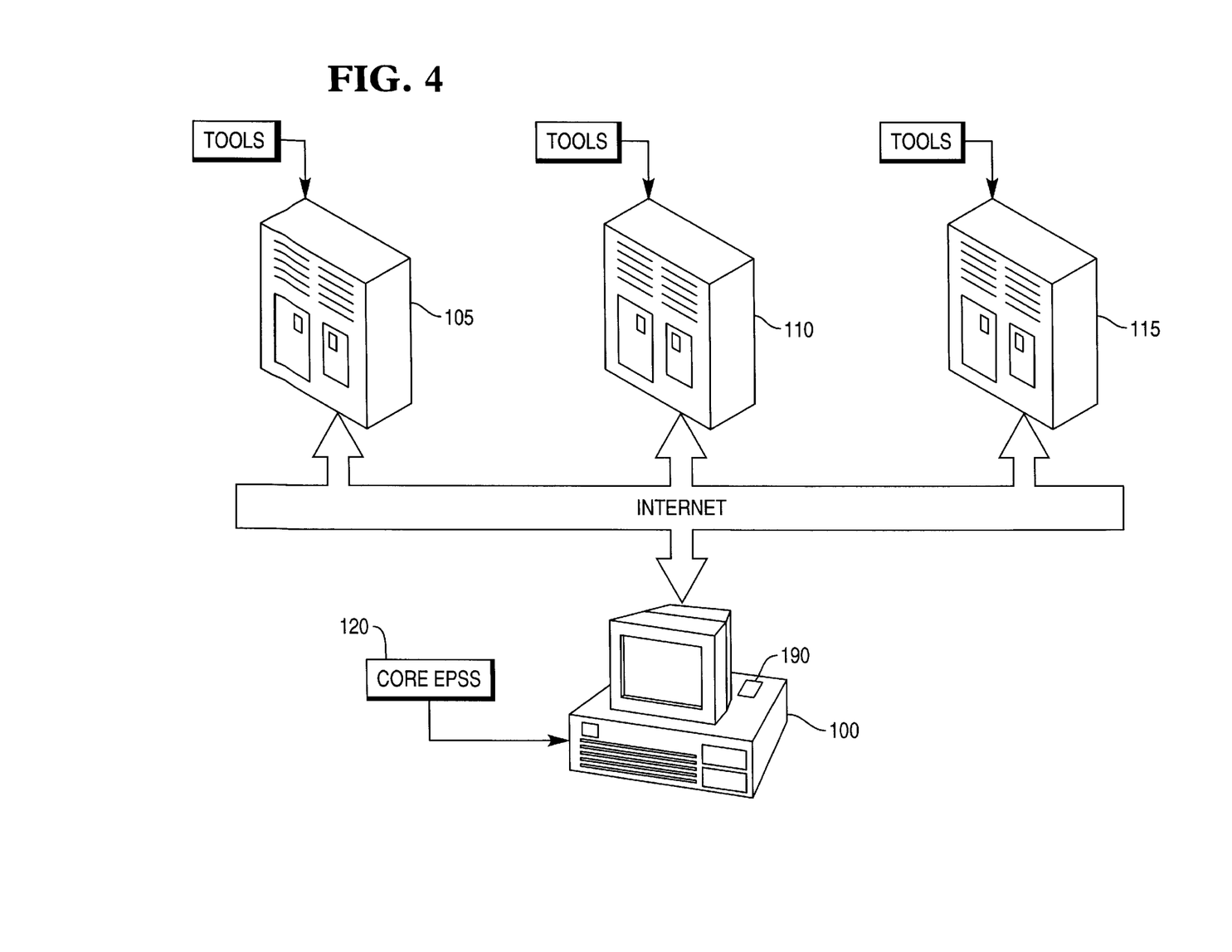
FIG. 4 illustrates an architecture implementing one form of the invention.

As stated above, the EPSS makes tools available to users, and makes different tools available, depending on the stage in the overall process where the user stands. In one form of the invention, a significant part, or all, of the tools are located not within the user's system, but at one, or more, remote sites. FIG. 4 illustrates one architecture implementing this form of the invention.

The user's computer 100 is located at one site, while remote computers 105, 110, and 115 are located at other sites. In general, there is no geographic restriction on the locations of the computers; they can be distributed worldwide. The computers communicate using a public-access telephone network, such as the INTERNET, as indicated.

The remote computers contain the programs necessary to execute the functionality indicated by the blocks associated with stages 3, 6, and 9 in FIG. 1, such as blocks 12, 15, 18, etc., and generically indicated as TOOLs in FIG. 4. The user's computer 100 contains the overall managing program, or core EPSS program, indicated by block 120.

The core EPSS program 120 possesses several distinctions from the tools. From one perspective, the core EPSS program performs the following abbreviated list of functions:

(1) It presents a graphical interface to the user;
(2) It allows the user to select a process, and also a stage (such as 3, 6, or 9 in FIG. 1) within the process;
(3) It presents a list of tools available for that stage;
(4) It allows the user to select a tool; and
(5) It launches the tool.

In contrast, the tools possess several different functions and characteristics:

(1) They are computer programs, or processes, which perform individual functions, specified by the user;
(2) In general, they will be manufactured by parties who are different from the manufacturer of the core EPSS program (although this is not required);
(3) They do not necessarily require the core EPSS program in order to function; and
(4) They will be modified as time progresses. An important feature of the third form of the invention relates to the last point, and will be illustrated by an example.

Assume that the owner of computer 105 is the developer of tool A, and the owner of computer 110 is the developer of tool B. Both of these owners continually modify their respective tools.

Whenever the user of computer 100 selects tool A or B, while running the core EPSS program, the core EPSS program retrieves the tool from computer 110 or 115, as appropriate. That is, no version of tool A or B is permanently stored at computer 100. This procedure provides several advantages.

One is the elimination of a requirement for storage space on computer 100, for storage of the tools.

A second is that computer 100 always obtains the most recent version of the tools (assuming, of course, that the developers of the tools maintain the most recent versions in computers 100 and 115).

A third is that the user is freed from the task of updating prior versions of the tools on the user's system. The updating task is performed by the developers, and is performed upon the tools stored in the remote computers 105 and 110, rather than upon tools stored in computer 100.

An additional advantage results from addition of a few additional processing steps. Explanation of this advantage requires some background explanation. Many programs (called "main programs" herein) require multiple sub-programs. The files containing these sub-programs are frequently installed in many different directories on the computer's storage system. These files tend to clutter the user's computer.

Further, the files are not always clearly labeled with an indication of the main program to which they belong. Consequently, if a user wishes to erase the files related to a particular main program, perhaps because the user wishes to discard that main program, the user cannot easily identify the files. Thus, the clutter cannot be easily removed. Moreover, in erasing the files, the user risks erasing important files which belong to other programs, because of the lack of clear labeling.

Figure 5:
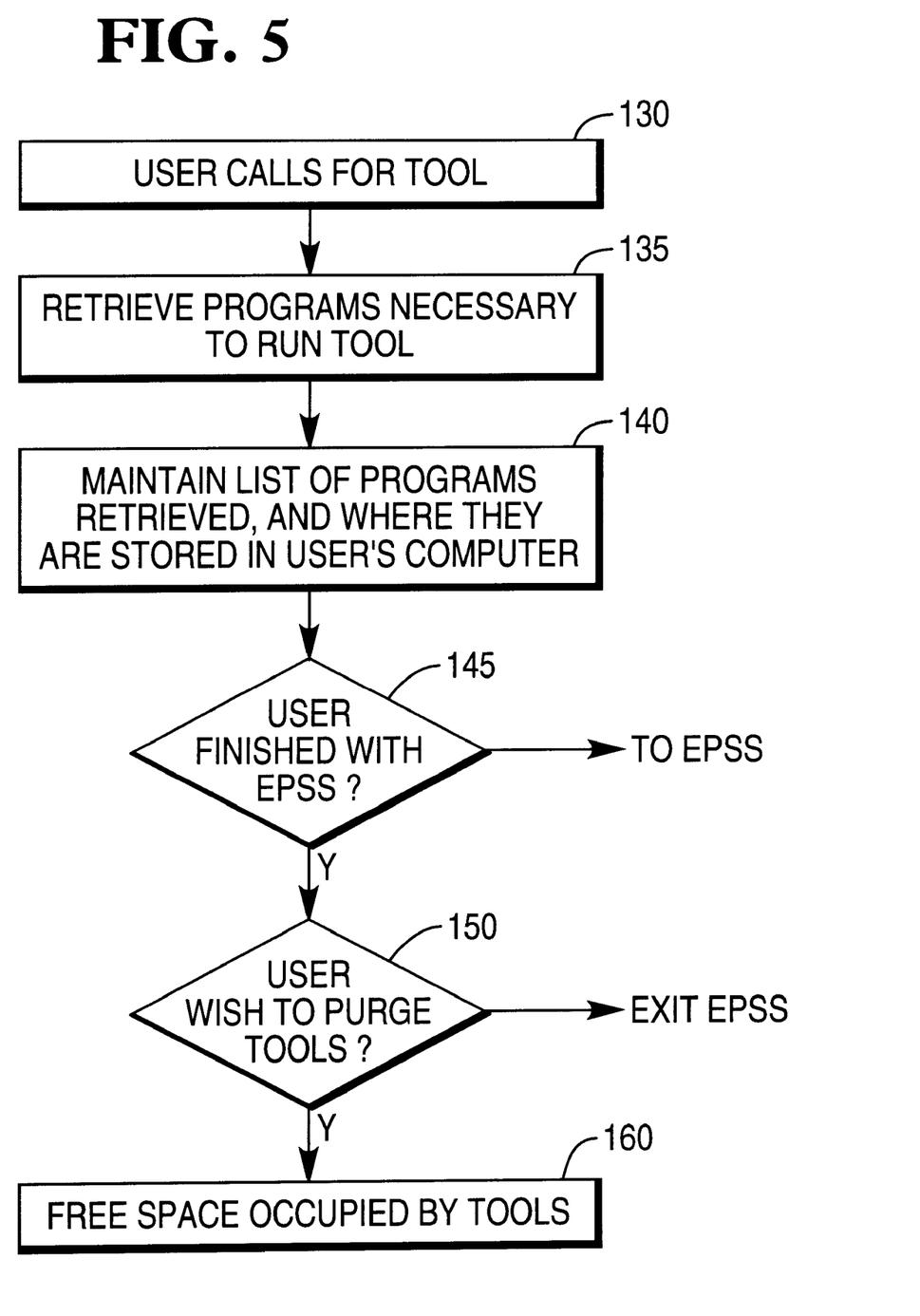
FIG. 5 is a flow chart illustrating logic followed by one form of the invention.

Under one form of the invention, the following additional steps are taken, as illustrated in FIG. 5. One is that, when the user calls for a tool, as indicated in block 130, the programs needed by the tool are retrieved, as indicated by block 135. As indicated by block 140, a list of the files retrieved from the remote computers is maintained, together with the locations where these files were stored in the user's computer 100.

In decision block 145, when the user finished with the EPSS, the invention asks, in decision block 150, whether the user wishes to purge computer 100 of these files. If the user answers "Yes," the computer takes appropriate procedures for erasing the files. These procedures will vary in detail, and the type of variation depends partly upon the type of hardware used in the user's computer 100.

For example, an actual erasure procedure may not be necessary. Instead, deletion of the name of a file from a particular table can be equivalent to erasure.

That is, in many operating systems, each disc drive contains, in effect, a table (sometimes termed a "file allocation table") or directory which lists the files contained on the disc, and their locations on the disc. The mechanism which reads and writes files to the disc is called a disc controller. The disc controller, when writing a file to the disc, first consults the table, in order to find empty space, so that the disc controller does not write new files where existing files reside.

However, if a file name is deleted from the table, then the space occupied by the file becomes available for new files. That is, the disc controller, in reading the table, learns, by the absence of the old file name, that the space occupied by the old file is not now being claimed. The disc controller can now write new data to the space occupied by the old file.

Thus, it is not strictly necessary to erase the entire files themselves (although that can be done), but simply removing the files' names from the table can be sufficient.

From another perspective, "erasure" itself is not desired, but the act of freeing the storage space occupied by the files, as indicated by block 160. Thus, irrespective of the details required by the hardware of the user's computer 100, upon termination of an EPSS by a user, the user is given the option of freeing the space occupied by the tools of the EPSS.

Figure 6:
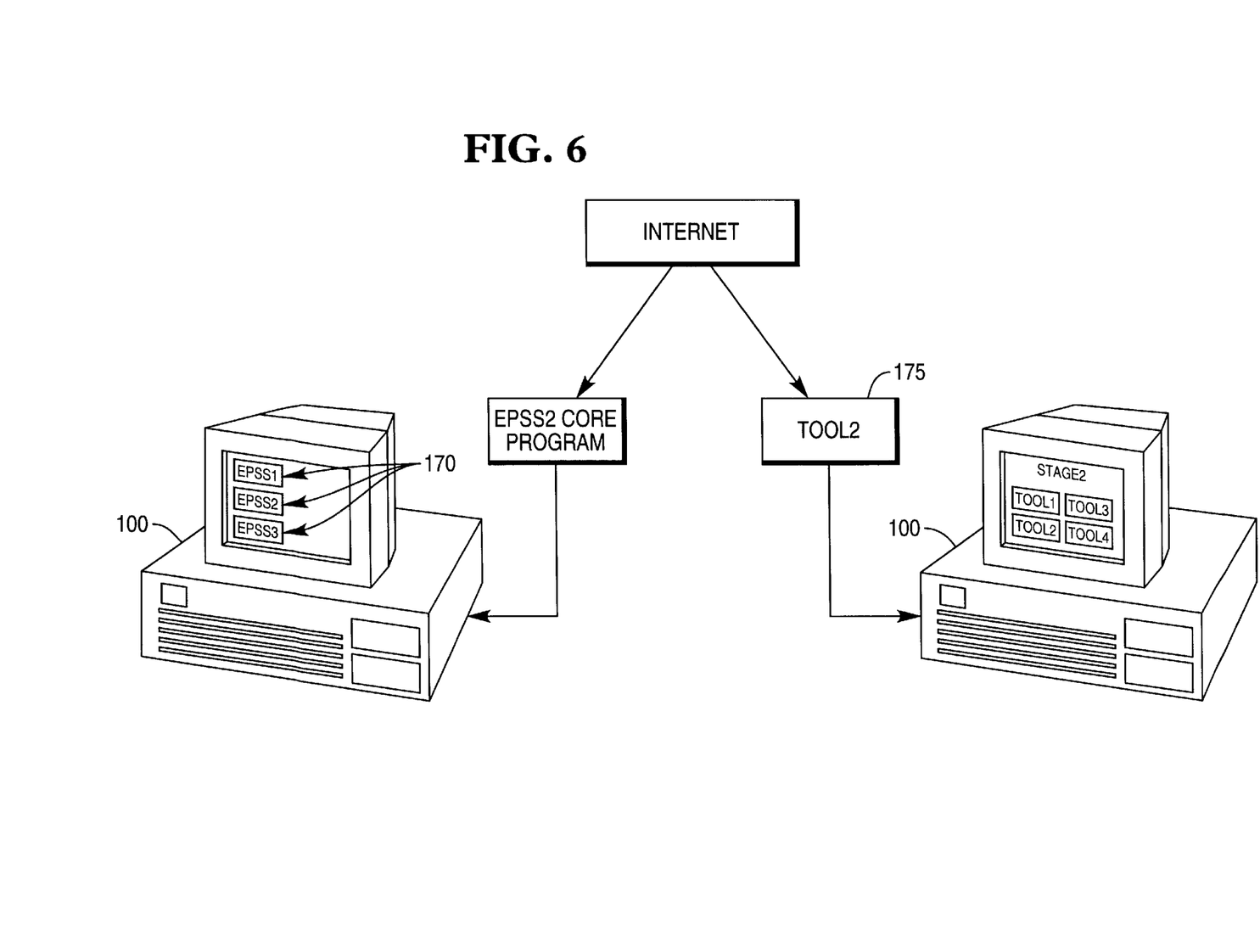
FIG. 6 illustrates retrieval of an EPSS, and then retrieval of TOOL2 for use with that EPSS.

In another approach, the EPSS core program itself is not resident on the computer 100. Instead, as indicated in FIG. 6, icons 170 are presented on the display of computer 100. Each icon corresponds to a different EPSS. When the user actuates an icon, such as that for EPSS2, a small program (not shown) is launched which retrieves the EPSS core program from the INTERNET, as indicated.

The invention launches that core EPSS program, which displays its normal interface. If, for example, the user stands at stage 2 of the EPSS, as indicated at the right of FIG. 6, and if the user selects the icon for TOOL 2, the invention retrieves, as indicated by block 175, the files necessary for tool 2.

As FIG. 1 indicates, each EPSS provides tools. A list of these tools, and a list of the programs which provide the tools, and their locations in the INTERNET, must be maintained somewhere. It is preferred that the list of tools, and their locations, be stored with the core EPSS program itself.

Thus, when the core EPSS program is stored at the user's computer 100 in FIG. 4, the list will also be stored at computer 100. Conversely, when the EPSS is not stored in the user's computer 100, as FIG. 6 indicates, then the list, and the EPSS itself, will be stored at a remote computer, such as computer 115 in FIG. 4.

One reason for maintaining the list with the core EPSS program, when the core EPSS program is stored remotely, is that it is expected that the maintenance and updates of the core EPSS program will be performed at its storage location, namely, computer 115, in this example. Since the list may be altered during this maintenance and updating, it is convenient that the list be stored with the EPSS core program.

Additional Considerations

1. The preceding discussion assumed that a provider manually examined the public registry for interest in the provider's product. However, in some cases, this examination is analogous to a match-seeking operation, which can be accomplished by, or assisted by, a computer program. For example, the general type of business in which a user's EPSS system is used is stated in the public registry.

For instance, the Internal Revenue Service of the United States Government has a rather extensive classification of types of businesses, each assigned a code number. The user of the EPSS places one, or more, of such code numbers into the public registry, together with other relevant material.

A provider runs a computer program which searches the public registry for predetermined code numbers. This search accomplishes an initial screening function, in screening out unwanted businesses. When EPSS users having the predetermined code numbers are found, a manual examination of the users' entries in the registry is undertaken.

In a more advanced system, a relational database can be generated, having multiple fields, such as (1) type of business, (2) volume of sales, (3) number of employees, (4) new products desired, and so on. The relational database is contained in the public registry. Each EPSS user places a record into the relational database. The record contains information in the fields which apply to the EPSS user.

Developers run a search of the fields, in search of records having combinations of fields of interest to the developer. When suitable records are found, the record-owners (i.e., the EPSS users) are contacted.

Relational databases are known in the art. One example of a relational database is a common telephone directory. Every person is assigned a record. That record includes several fields, such as the person's (1) name,
(2) numerical street address,
(3) street name,
(4) city, (5) state, and (6) telephone number.

The relational database allows selected combinations of fields to be searched. For example, a search can be undertaken of field (3), to find all persons living on "Pine" street. As another example, a search can be undertaken of fields (3) and (1), looking for all persons living on "Pine" street, and having the name of "Smith."

The data regarding EPSS owners can be similarly structured in the public registry, to facilitate searching and matching with tool developers.

2. It is recognized that the term "publicly available place" is not necessarily to be taken literally. That is, a computer bulletin board can qualify as the "place," but can actually be a virtual entity, having no single location.

In addition, it is customary to speak of loading, and running, a given executable file as "launching" the file, or a program contained within the file. However, under the invention and elsewhere, a given tool may require multiple files, containing multiple executable programs and multiple data blocks. Thus, to speak of "launching" a single program may be technically incorrect. Rather, "launching" the "tool" appears to be correct terminology.

3. The computer 100 in FIG. 4 contains an operating system 190, such as DOS or Windows, both available from Microsoft Corporation, Redmond, Wash.

4. It was stated above that a developer of tool A may own computer 105 in FIG. 4. That developer may store, maintain, update, and modify all the software necessary to run tool A, and these actions may take place on computer 105, or on affiliated computers. That is, the developers' agents have power and authority to modify the software which runs tool A.

In contrast, the user of computer 100 who retrieves tool A has no such power to modify That user only has access to tool A on a "read-only" basis. From another point of view, that user does not "replace" tool A when the user is finished; replacement is not necessary, because tool A is a virtual entity. (If tool A were not a virtual entity, but were, for example, a library book, then replacement may be necessary.)

5. Tools include not only computer programs, but also data. For example, a spreadsheet program represents a tool, and the spreadsheet itself (i.e., data) also represents a tool.

6. U.S. Pat. No. 5,655,086 issued Aug. 5, 1997, entitled "Configurable Electronic Performance Support System for Total Quality Management Processes" is hereby incorporated by reference.

Numerous substitutions and modifications can be undertaken without departing from the true spirit and scope of the invention. What is desired to be secured by Letters Patent is the invention as defined in the following claims.

What is claimed is:

1. A process comprising the following steps:

a) operating a core Electronic Performance Support System, EPSS, at a station;

b) detecting a user's selection of a tool offered for use with the core EPSS;

c) retrieving from a repository of tools, separate from the core EPSS, one, or more, files which support the selected tool wherein said repository of tools allows different tools to be used by the core EPSS located at the station than tools installed when the core EPSS was installed; and d) launching one, or more, of the files retrieved.

2. Process according to claim 1, and further comprising the following steps:

e) when the user is near termination of usage of the EPSS, inquiring whether the user wishes to purge the retrieved files and, if so, freeing storage space occupied by said files in a user's computer.

3. Process according to claim 1, and further comprising the step of modifying file allocation tables in storage discs, when the user terminates the EPSS.

4. Process according to claim 3, wherein the step of modifying file allocation tables includes the step of deleting one or more file names from the file allocation table.

5. Process according to claim 1, and further comprising the following steps:

e) maintaining a list of files retrieved, and locations where they are stored in a user's computer; and f) erasing the files retrieved, when the user terminates the EPSS.

6. A computer, comprising:

a) an operating system;

b) a core Electronic Performance Support System, EPSS, which supports a process, and, at different stages in the process, offers tools for use, which are not offered at other stages, wherein said tools are located in a repository separate from the core EPSS and wherein said repository of tools allows different tools to be used by the core EPSS; and c) means for retrieving files, needed to run tools, from a public-access computer network.

7. Computer according to claim 6, wherein all files which run at least one tool are not permanently stored in the computer.

8. Computer according to claim 6, wherein the computer permanently stores no files for any tools.

9. The computer of claim 6 wherein said core EPSS and said repository do not include a menu structure which prevents addition of new tools to the menu structure.

10. The computer of claim 6 wherein said repository includes an index of the stages of the core EPSS to which the tools are relevant.

11. A computer, comprising:

a) an operating system;

b) a core Electronic Performance Support System, EPSS, with which tools are used, wherein said tools are located in a repository separate from the core EPSS and wherein said repository of tools allows different tools to be used by the core EPSS than tools installed when the core EPSS was installed; and c) means for retrieving files, needed to run tools, from a public-access computer network.

12. The computer of claim 11 wherein said core EPSS and said repository do not include a menu structure which prevents addition of new tools to the menu structure.

13. The computer of claim 11 wherein said repository includes an index of the stages of the core EPSS to which the tools are relevant.

* * * * *